United States Patent [19]

Plantenga et al.

[11] Patent Number: 4,830,902

[45] Date of Patent: May 16, 1989

[54] PAPER OBJECT PRINTED WITH INK AND COATED WITH A PROTECTIVE LAYER

[75] Inventors: Tjalling M. Plantenga, Vreeland; Gerhardus J. Mulder, Odijk, both of Netherlands

[73] Assignee: Joh. Enschede En Zonen Grafische Inrichting B.V., Haarlem, Netherlands

[21] Appl. No.: 87,421

[22] Filed: Aug. 19, 1987

[30] Foreign Application Priority Data

Aug. 19, 1986 [EP] European Pat. Off. ........ 86 201435.4

[51] Int. Cl.$^4$ .................... B32B 3/00; B32B 9/06; B05D 1/36; B41M 5/02
[52] U.S. Cl. .................... 428/207; 428/211; 428/488.1; 428/523; 428/537.5; 428/498; 428/499; 101/426; 427/258

[58] Field of Search ............... 428/488.1, 537.5, 205, 428/211, 207, 498, 523

[56] References Cited

U.S. PATENT DOCUMENTS

| | | | |
|---|---|---|---|
| 3,506,467 | 4/1970 | Ulrich | 428/205 |
| 4,452,843 | 6/1984 | Kaule et al. | 428/211 X |
| 4,663,212 | 5/1987 | Boultinghouse | 428/488.1 X |

FOREIGN PATENT DOCUMENTS 2830004 8/1979 Fed. Rep. of Germany ... 428/488.1

Primary Examiner—P. C. Ives
Attorney, Agent, or Firm—Lester Horwitz

[57] ABSTRACT

Paper, and especially bank notes, printed with ink that contains micronized wax is coated with cellulose ester or ether. Thereby it becomes soil-repelling and its useful life-time increases considerably.

6 Claims, No Drawings

PAPER OBJECT PRINTED WITH INK AND COATED WITH A PROTECTIVE LAYER

This invention relates to paper printed with ink and covered by a protective coating, and to a process for producing the same. More particularly, the invention looks to provide paper currency, documents and other kinds of printed matter that are subject to intensive circulation and frequent use with a protective layer to counteract soiling so that they may have a longer useful life.

As the useful life of paper currency is mainly determined by soiling in circulating, it is quite worthwhile to make paper currency more or less dirt repelling.

Coating paper currency with a thin layer of polyamide for this is known;

Since 1955 Dutch bank notes have had a coating of ultramid (trademark) brand of polyamide. However, the effect of this polyamide coating is not yet satisfactory; it does add to the strength of the paper and to keeping the paper clean to enhance its life, but these effects are quite limited, and it seems that dirt of a lipopphilic nature may even be attracted rather than repelled.

Moreover coating printed paper creates the problem that the coating does not adhere well to the printed parts, especially if the printing ink contains wax.

Nowadays wax is often incorporated into printing ink to improve its rheological properties and prevent its transfer onto the next sheet in a pile of paper freshly printed paper therewith. The latter is important because waiting until the ink is thoroughly dry is not consistent with the high production rates used nowadays. The non-transference of wax-containing ink seems to be due to protrusion of the wax particles from the ink, because of which one printed sheet in a pile makes no real contact with the next sheet. However, when the above-described coating applied to thus-printed paper, it is removed easily, even by rubbing with the fingers only.

The wax is incorporated into the ink by stirring in a wax dispersion. This wax dispersion can be made in several ways. The most common way is melting the wax with the appropriate amount of hydrocarbon oil or a mixture of the oil and a binder at elevated temperatures under vigorous agitation and slowly cooling down the resulting blend. Another method is to dissolve the wax in a real solvent for the wax at elevated temperatures, then mixing in a co-solvent in which the wax is less soluble, and then cooling the mixture to room temperature. The necessary temperature increase depends in both cases on the nature of the wax component; typical values are from 80° to 140° C. In this manner very fine dispersions of wax in the liquid phase (particles <10 micrometer) can be obtained.

Now we have found that paper printed with wax-containing ink may be coated with a well-adhering layer of varnish which will repel dirt and add to the useful life of the thus treated paper if the wax in the ink is micronized wax and the varnish is a cellulose ester or ether.

Thus the present invention provides paper objects printed with ink and coated with a protective layer, having as characterizing features that the printing ink contains 1–10% by weight of micronized wax and that the protective coating consists for a major part of cellulose ester or ether.

In the present specification and claims by "micronized wax" is understood wax that has been subject to a special grinding treatment by which it consists for the greater part of particles of 30 micrometer and smaller and for a minor part of particles smaller than 10 micrometer. The micronizing of wax is described by T. C. Patton in "Paint Flow and Pigment Dispersion", 2nd Ed. (John Wiley & Sons, New York, 1979) page 378 and by H. F. Payne in "Organic Coating Technology", Vol. II (John Wiley & Sons, New York, 1960) pages 715 and 777, and the product may be obtained from E. G. Hoechst A.G. in Germany or from Cera Chemie at Deventer (The Netherlands).

The micronized wax may have various compositions and be of various origin. e.g. it may be polyethylene, polypropene, ethene-propene copolymer, hydrocarbon resin or montan wax, or it may be an animal or vegetable wax such as bees wax, carnauba wax or candellila wax, etc. By preference it is polyethylene.

Said micronized wax is not dispersed into the ink by melting it with mineral oil or a mixture of oil and binder but by kneading or blending it with the oil, the ink binder or mixture thereof at room temperature or slightly elevated temperature, in such a way that the particle size is modified hardly or not at all.

The ink may contain 1–10% by weight of micronized wax. By preference it contains 1–5% by weight of micronized wax.

The ink to be used according to the invention may contain, apart from the micronized wax, all the ingredients that are usual for printing inks. The drying of the ink may be caused by absorption by the paper fibres and/or pentetration of the liquid constituents in the paper fibres, or by evaporation of solvent or in any other way. The invention is particularly useful for paste ink which dries by reaction with oxygen from the air.

As binder and pigment any composition known therefor is applicable, and in physically drying inks any usual solvent may be applied.

Moreover the ink may contain any of the known and usual additives, such as fillers and drying agents and mixtures thereof.

The protective coating has to consist substantially of cellulose ester or ether. Additionally it will generally contain plastifier, generally 1 part by weight for 5 to 20 parts by weight of cellulose derivative. Examples of suitable plastifiers are the alkyl esters of dicarboxylic acids such as the dimethyl, diethyl, dipropyl, dibutyl, di(2-ethylhexyl), di-octyl and dibenzyl esters of succinic, adipic and phthalic acids, low-molecular acryl derivatives, diacyl derivatives of sucrose, sorbitan and oxyalkylated sorbitan such as sucrose acetate, proprionate, camphor, etc., etc. Moreover minor amounts of other constituents such as optical brighteners may be present.

The cellulose ester has to contain 1–40% by weight of acetyl groups, 0–50% by weight of propionyl groups and 0–60% by weight of butyryl groups, the hydroxyl group content being from 0 to 5.5% by weight.

By preference the cellulose derivative is a mixed ester containing both acetyl groups and propionyl and/or butyryl groups, as such esters are soluble in alcohol/water mixtures whereas cellulose acetate requires ketones like acetone and butanone for dissolving. Consequently a preferred composition is 5–20% by weight of acetyl groups and 20–40% of propionyl and/or butyryl groups, the hydroxyl group content being above 3%, by preference 4–5.5.%. With higher hydroxy-group levels the contents of propionyl and/or butyryl groups also may be somewhat higher, up to 41%, resp. 44%.

If the cellulose derivative is an ether it may be any cellulose ether that is not water soluble, e.g. any methyl cellulose, ethyl cellulose or butyl cellulose of sufficiently high substitution degree.

Processes for preparing the above-mentioned cellulose derivatives are sufficiently known and need not be discussed here in detail. Moreover all these cellulose derivatives may be obtained commercially, e.g. from Eastman Kodak and Du Pont de Nemours in the U.S., Bayer A.G. in Germany, Gevaert in Belgium, and others.

The invention also comprises a process for producing the above-described printed paper having a protective coating, wherein paper is printed with an ink which comprises binder, pigment and optionally solvent, drying agent and/or other auxiliaries, and subsequently is covered with a layer of varnish. The process according to the invention is characterized in that the ink contains 1–10% by weight of micronized wax and in that the protective coating consists for a major part of cellulose ester or ether.

The composition of the ink and the micronized wax may be selected along the above-discussed lines. The ink may be applied by any of the known printing techniques, E.G. by a relief, intaglio or silk screen process or by planography.

The composition of the coating has been discussed above. As the cellulose ester or ether coating will generally be applied as a solution the cellulose derivative is by preference a mixed ester containing both acetyl and propionyl and/or butyryl groups, as such mixed esters are soluble in alcohol/water mixtures and do not require ketones for dissolution as does cellulose acetate. Alcohol/water mixtures are preferred above ketones because they are scarcely inflammable or not at all and because their toxicity is generally lower.

The actual way in which the coating solution is applied is not critical and it may be done by spraying, dipping, roller coating or whatever technique that is convenient under the prevailing conditions, during or after applying the coating solution, the solvent is evaporated and it may be recovered, both for economical and environmental considerations.

Applicant does not want to be bound by any theory, but he believes the favourable results of the combination of micronized-wax-containing ink and cellulose derivatives to be due to a better wetting of the wax particles and the ink-binder phase by the cellulose derivative. The repellance of dirt by the cellulose ester or ether may be due to the rather hydrophilic nature of said cellulose derivatives but, again, these are just theoretical considerations.

The invention may find a great variety of applications, amongst which bank notes and currency notes, identity cards and other official certificates, sample holders and sample displays, season tickets, catalogues and single catalogue cards, maps and city plans, playing cards, displays of directions for use and other instructions, botanical and zoological guides, etc.

The invention will now be illustrated by a few nonrestricting examples.

EXAMPLE 1

Paper having a thickness of 100 g/m² was printed with an ink having the following composition:

| | |
|---|---|
| ALKYD RESIN (BINDER) | 59% BY WEIGHT |
| CARBON BLACK (PIGMENT) | 20% BY WEIGHT |
| SILICA GEL (FILLER) | 10% BY WEIGHT |
| WAX DISPERSION | 10% BY WEIGHT |
| DRYING AGENT MIXTURE | 1% BY WEIGHT |
| THE COMPOSITION OF THE WAX DISPERSION WAS: | |
| MICRONIZED POLYETHYLENE ("CERIDUST 3620" FROM HOECHST AG) | 30% BY WEIGHT |
| ALKYD RESIN | 10% BY WEIGHT |
| MINERAL OIL | 60% BY WEIGHT |

It will be appreciated that this ink contains 3% by weight of micronized wax.

The printed sheets were stacked without any difficulty, no coming off of the black ink onto the next sheets was observed. Next they were coated by spraying at short distance with a coating solution having the following composition in a rate to give a coating weight of 2 g/m²:

| | |
|---|---|
| CELLULOSE ACETATE PROPIONATE | 13% BY WEIGHT |
| SUCROSE ACETATE ISOBUTYRATE | 2% BY WEIGHT |
| ISOPROPANOL | 73% BY WEIGHT |
| WATER | 12% BY WEIGHT |

The cellulose acetate propionate was the product "Cap 504/0.2" from Eastman Kodak, having an acetyl group content of 2.5%, a propionyl group content of 40% and a hydroxyl group content of 5.0% and having a viscosity of 0.2 seconds (estimated according to ASTM D-1343, in the solution described as formula A, ASTM D-817).

The coated paper was dried with a current of air of about 80°–90° C. It looked excellent and kept well when folded and handed over frequently.

EXAMPLE 2

The process of Example 1 was repeated, except that the composition of the coating solution was now as folllows:

| | |
|---|---|
| CELLULOSE ACETATE BUTYRATE (1) | 5% BY WEIGHT |
| CELLULOSE ACETATE BUTYRATE (2) | 10% BY WEIGHT |
| DIOCTYLPHTHALATE | 1% BY WEIGHT |
| ETHYL ACETATE | 10% BY WEIGHT |
| BUTYL ACETATE | 15% BY WEIGHT |
| ETHANOL | 59% BY WEIGHT |

(1) THIS CELLULOSE ACETATE BUTYRATE WAS THE PRODUCT "CAB 553/0.4" FROM EASTMAN KODAK, HAVING AN ACETYL GROUP CONTENT OF 2.0% BY WEIGHT, A BUTYRYL GROUP CONTENT OF 47% BY WEIGHT AND A HYDROXYL GROUP CONTENT OF 4.3% BY WEIGHT, AND HAVING A VISCOSITY OF 0.4 SECONDS (ESTIMATED ACCORDING TO ASTM D-1343 IN THE SOLUTION DESCRIBED AS FORMULA A, ASTM D-817).
(2) THIS CELLULOSE ACETATE BUTYRATE WAS THE PRODUCT "CELLIT BP-300" FROM BAYER A.G., HAVING AN ACETYL GROUP CONTENT OF 14% BY WEIGHT, A BUTYRYL GROUP CONTENT OF 37% BY WEIGHT, AND A HYDROXYL GROUP CONTENT OF 1.2% BY WEIGHT, AND HAVING A VISCOSITY OF 30–60 MPA.SEC. ESTIMATED ACCORDING TO DIN 53015 WITH A 20% SOLUTION IN ACETONE/ETHANOL 9:1 AT 23° C.

EXAMPLE 3

Paper having a thickness of 100 g/m² was printed with an ink having the following composition:

| | |
|---|---|
| CELLULOSE ACETATE PROPIONATE | 5% BY WEIGHT |

| | |
|---|---|
| (BINDER) | |
| PHTHALOCYANINE BLUE (PIGMENT) | 20% BY WEIGHT |
| ETHANOL | 52% BY WEIGHT |
| ETHYL ACETATE | 22% BY WEIGHT |
| WAX DISPERSION ("CERIDUST VP 3910" FROM HOECHST A.G.) | 1% BY WEIGHT |

The printed sheets were dried to remove the solvent and were then stacked without difficulty, no coming off being observed at all. After the stack of printed paper was fully dry, the sheets were coated in the way described in Example 1 with a varnish composition as specified in Example 1. The coated sheets were then dried with air of about 90° C. The finished product looked excellent and kept well when folded and handed over frequently.

We claim:

1. A paper object printed with ink and coated with a protective layer, comprising: a piece of paper printed with ink that comprises 1-10% by weight of micronized wax; and a protective coating on the printed piece of paper consisting essentially of cellulose ester or ether.

2. The paper object according to claim 1, wherein the protective consists substantially of cellulose ester comprising 1-40% by weight acetyl groups, 0-50% by weight propionyl groups, 0-60% by weight butyryl groups, and from 0 to 5.5% by weight hydroxyl group.

3. The paper object according to claim 2, wherein the cellulose ester comprises 5-20% by weight acetyl groups, 20-40% by weight of propionyl and/or butyryl groups, and 4-5.5% by weight hydroxyl group.

4. The paper object according to claim 1, wherein the protective coating comprises 1 part by weight plastifier and from 5 to 20 parts by weight cellulose derivative.

5. The paper object according to claim 1, wherein the printing ink contains 1-5% by weight micronized wax.

6. The paper object according to claim 5, wherein the micronized wax is micronized polyethene.

* * * * *